Dec. 1, 1959   C. A. DUNLOP   2,915,322
TUBING JOINT CONNECTION
Filed May 3, 1956
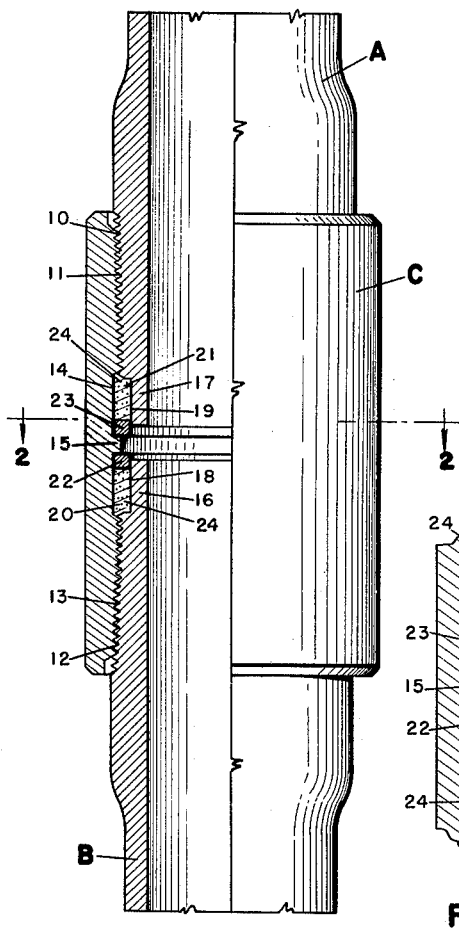
FIG. 1.
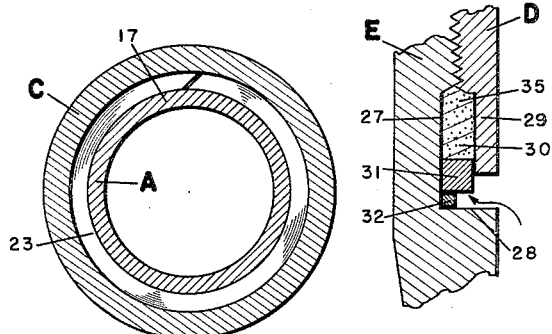
FIG. 1A.
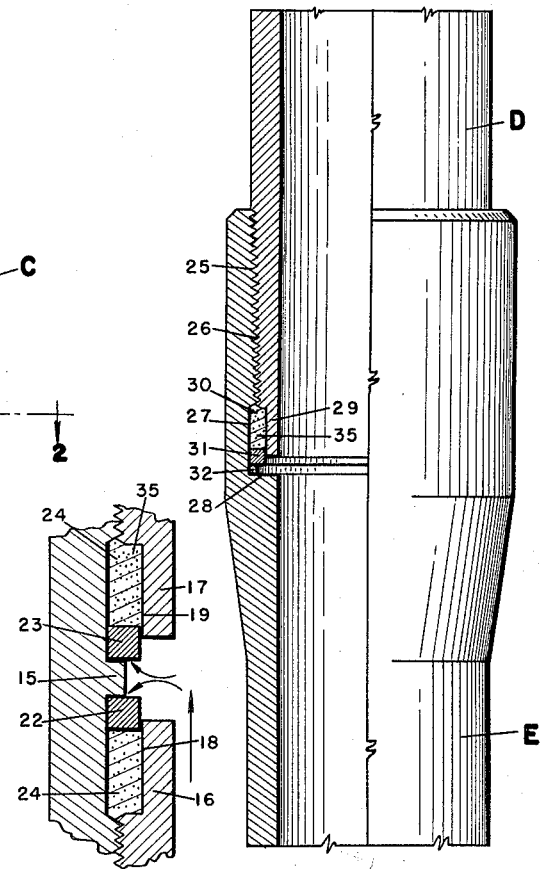
FIG. 3.
FIG. 2.
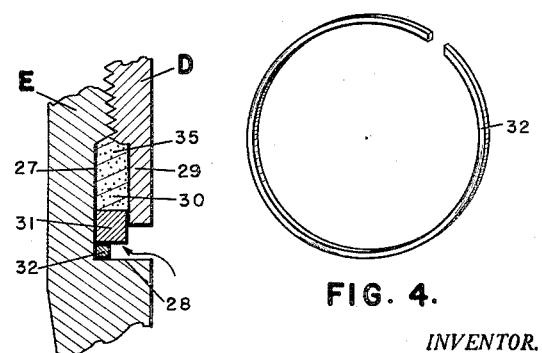
FIG. 3A.
FIG. 4.
INVENTOR.
Charles A. Dunlop,
BY John A. Schneider
ATTORNEY.

United States Patent Office 2,915,322
Patented Dec. 1, 1959

2,915,322

TUBING JOINT CONNECTION

Charles Arthur Dunlop, Houston, Tex., assignor, by mesne assignments, to Jersey Production Research Company, Tulsa, Okla., a corporation of Delaware Application May 3, 1956, Serial No. 582,404

6 Claims. (Cl. 285—10)

This invention is directed to pipe connections. More specifically, it is directed to pipe connections employed in well drilling and producing operations. In such operations sections of pipe are connected or coupled together to form a fluid-tight conduit. These pipe sections are subjected, in the course of producing and drilling operations, to high fluid pressures and to large torsional or tensional forces, or both, which makes maintenance of a fluid seal at the pipe connections or coupling joints a difficult problem.

The threaded connections for these pipe sections and couplings do not in many instances provide adequate sealing surfaces due to machining inaccuracies, erosion, corrosion or physical damage to the threads. This causes fluid flow passages through the threaded connection thereby resulting in leaks when the pipe sections and couplings are placed in operation. To prevent such leaks through the connections it has been the practice to coat the engaging or mating threaded surfaces with a lubricant or thread sealing compound to seal off any passages resulting from inaccuracies in or misfit of the threads. Also it has been the practice when a leak has developed in a connection to effect a seal by forcing additional sealing or thread compound into the threads under pressure.

Hence, an object of this invention is to provide an improved fluid-tight joint or coupling for pipe sections.

A further object of this invention is to provide an improved fluid-tight joint or coupling for pipe sections employed in well operations whereby sealing means are provided for the threaded coupling and pipe connections and whereby this sealing means is automatically maintained by forcing the sealant between the threads of the connection by means of the pressure of the fluid within the pipe sections.

Briefly, this invention comprises a threaded connection for pipes having at least one reservoir adjacent the threads which fluidly communicates with the interior of the pipes. Sealing means is located in the reservoir and movable means is positioned in the reservoir adapted to transmit the force exerted by the fluids in the pipes to the sealing means and stop means is arranged adjacent the reservoir to retain and limit the travel of the movable means in the reservoir.

One embodiment of the invention comprises a pipe coupling having an internal recess which is threadedly engaged with first and second pipe sections. The pipe sections are externally recessed at their respective adjacent ends to provide annular reservoirs with the coupling recess. A sealant or sealing means is provided in each of the reservoirs and movable means are positioned in each of the reservoirs to retain and transmit or exert pressure upon the sealing means. A stop means is arranged on the interior of the coupling or sleeve for retaining the movable means in the reservoir.

Another embodiment of the invention comprises a pipe connection having threadedly engaging pipe sections, one of the pipe sections being recessed adjacent one end thereof and the other section being recessed adjacent the threads thereon to provide a shoulder and an annular reservoir with the recess in the one pipe section. Sealing means is provided in the reservoir adapted to seal the threadedly engaged surfaces of the pipes from fluid flow therethrough. Movable means is arranged in the reservoir adapted to transmit force exerted by the fluids in the pipes to the sealing means.

Referring to the drawings,

Fig. 1 is an elevational, partly sectional, view of one embodiment of the invention.

Fig. 1A is an enlarged fragmentary view of a portion of Fig. 1;

Fig. 2 is a plan view taken on lines 2—2 of Fig. 1;

Fig. 3 is an elevational, partly sectional, view of another embodiment of the invention;

Fig. 3A is an enlarged fragmentary view of a portion of Fig. 3;

Fig. 4 is an oblique view of the spring washer which is inserted below the piston as shown in Fig. 3.

Referring more particularly to the drawings for a more detailed explanation of the structure of this device, the embodiment of Figs. 1, 1A, and 2 shows pipe sections A and B connected together by means of coupling sleeve C. Pipe section A is provided with screw threads 10 adjacent one end which threadedly engage threads 11 formed on one end of sleeve C. Pipe section B is provided with threads 12 adjacent one end which threadedly engage with threads 13 formed on the outer end of coupling C. Coupling C is provided with a machined-out recess 14 formed between the threads 11 and 13. A shoulder 15 formed on the interior of sleeve C extends into the recessed portion 14 approximately midway between threads 11 and 13.

The male or pin members 16 and 17 of pipe sections B and A, respectively, are recessed as at 18 and 19, respectively, to form reservoirs 20 and 21, respectively, between the pipe sections B and A and the recesses in the wall of the coupling sleeve C. Annular floating piston members 22 and 23 are positioned in reservoirs 20 and 21, respectively, and are retained in the reservoirs by means of shoulder stop 15 which may suitably be formed integral with the interior wall of sleeve C. A suitable lubricant or thread sealing compound 24 is located in reservoirs 20 and 21.

The embodiment of Figs. 3 and 3A shows male and female pipe sections D and E screw threadedly connected together. Male pipe section D is provided with screw threads 25 adjacent one end which are threadedly engaged with threads 26 formed on one end of female pipe section E. Pipe section E below the threads 26 is formed with a recessed portion 27 and a shoulder 28. Pipe section D is provided with an extension 29 (which may or may not be recessed) to form a reservoir 30 with the recessed portion 27 of pipe section E between pipe sections D and E. A floating piston member 31 is arranged in reservoir 27. This floating piston member is identical to the piston members 22 and 23 of Fig. 1. A spring washer 32 may be positioned below the floating piston member 31 to insure application of fluid pressure across the lower face of the piston member 31. The fluid pressures within pipe sections D and E act on the piston member 31 through the opening between pipe sections D and E. Similarly as in the embodiment of Fig. 1, the reservoir 30 is provided with a lubricant or thread sealing compound 35.

The spring washer 32 is shown more clearly in Fig. 4 and, as seen therein, comprises a split resilient ring member that is made of any desired type resilient material such as metals, plastics, etc.

In operation (Figs. 1, 1A and 2), the lubricant or sealing compound is supplied to the reservoirs 20 and 21 as excess lubricant squeezed out of the joint when the joint is connected, that is, the mating threads 10, 11 and 12, 13 are provided with a sufficient amount of lubricant or thread sealing compound so that when pipe sections A and B are threadedly connected to the coupling C the excess lubricant will squeeze from between the threads and deposit in the reservoirs 20 and 21.

The piston members 22, 23, as shown more clearly in Fig. 2, are preferably annular split rings to facilitate insertion in the reservoirs. These rings may suitably be formed of cast or wrought iron, steel, hard rubber, plastic, etc. Continuous rings may be employed as the piston members provided they are made of material sufficiently deformable to enable insertion in the reservoirs but sufficiently rigid to maintain piston-like characteristics.

As shown by the arrows in Fig. 1A, fluid pressure within the pipe conduits A and B enters between the openings in the pipe sections and exerts fluid pressure upon piston rings 22 and 23 thereby applying pressure upon the lubricant or thread sealing compound in reservoirs 21 and 20 which in turn forces lubricant or thread sealing compound into voids between engaged, mating threads 10, 11 and 12, 13, respectively. The rings 22 and 23 serve to retain lubricant in the reservoir and prevent it from being extruded into the pipe conduit. The shoulder stop 15 supports the ring members 22 and 23 and limits their travel when the rings are forced upward or downward, respectively, by thread sealing compound expelled into the reservoir.

The operation of the embodiment of Figs. 3 and 3A is similar to that described supra for the operation of the embodiment of Fig. 1. The mating threads 25, 26 are provided with a sufficient amount of lubricant or thread sealing compound so that when pipe sections D and E are threadedly connected the excess lubricant squeezes from between the threads and deposits in the reservoir 30. The spring washer 32 is positioned on shoulder 28 and supports the face of piston member 31 exposed to pipe fluid pressures.

As shown by the arrows in Fig. 3A, fluid pressure within the pipe sections D and E enters the opening between the pipe sections and exerts fluid pressure upon the exposed face of piston ring 31 thereby applying pressure or force upon the lubricant or thread sealing compound in reservoir 30 which in turn forces lubricant or thread sealing compound into the voids between engaged, mating threads 25, 26. The ring 31 serves to retain lubricant in the reservoir and prevents it from being extruded into the pipe conduit. The shoulder stop 28 supports spring washer 32 which in turn supports ring member 31 in its lowermost position as shown. Thus the travel of ring 31 when forced downward by thread sealing compound expelled into the reservoir 30 is limited by washer 32 and shoulder stop 28.

The thread sealing compound may be of any suitable type but is preferably of a type described in American Petroleum Institute Bulletin 5A-2, first edition, November 1952, entitled, "High Pressure Thread Compound." Accordingly, the thread sealing compounds may suitably comprise a lubricating or plastic sealing base mixed with finely divided nondeformable materials. For example, the plastic lubricating base may be an aluminum stearate base grease with finely divided filler material and lubricating solids such as a combination of zinc, copper, lead and graphite.

The numerous advantages of this invention over the prior art are obvious from the foregoing description. For example, this invention utilizes the pressure of the fluids in the pipe sections to automatically maintain and force the lubricant or sealing compound between the threaded surfaces of the pipe connections. The use of a piston member prevents the lubricant or thread sealing compound from being extruded into the interior of the pipe section where it would be lost with the fluids flowing therein. Also, the sealing compound is maintained adjacent the threads even when a higher pressure is applied exterior of the pipes since the stop member retains the piston members in the reservoirs thereby retaining the sealing compound in the reservoirs.

What I wish to claim is:

1. A pipe connection comprising a sleeve threadedly engaging with first and second pipe sections and having annular reservoirs formed between concentric cylindrical surfaces of said sections and said sleeve, a fluid thread sealing agent arranged in each of said reservoirs adapted to be squeezed between the threadedly engaged surfaces of said sleeve and pipe sections, and annular fluid pressure movable piston members reciprocal in each of said reservoirs and closing the inner ends of each of said reservoirs and open to the inside of said sections at the inner axial ends to transmit force exerted by fluids in said pipe sections to each of said sealing agents, said piston members preventing extrusion of said agents into the interiors of said pipe sections.

2. Apparatus as recited in claim 1 including means adapted to form a pressure space adjacent each of said piston members to permit internal fluid pressure to act on said piston members.

3. Apparatus as recited in claim 1 wherein said piston members comprise split rings engaging the walls of said reservoirs.

4. A pipe connection comprising threadedly engaged first and second pipe sections having an annular reservoir formed between concentric cylindrical surfaces of said sections adjacent the interior end of said engaged threads, a fluid thread sealing agent arranged in said reservoir adapted to be squeezed between the threadedly engaged surfaces of said sections, and an annular fluid pressure movable piston member reciprocal in said reservoir and closing the inner end of said reservoir and open to the inside of said sections at the inner axial end to transmit force exerted by fluids in said pipe sections to said sealing agent, said piston member preventing extrusion of said agent into said pipes.

5. Apparatus as recited in claim 4 including means adapted to form a pressure space adjacent said piston member to permit said internal fluid pressure to act on said piston member.

6. Apparatus as recited in claim 4 wherein said piston member comprises a split ring engaging with the wall of said reservoir.

References Cited in the file of this patent

UNITED STATES PATENTS

| 961,151 | Moore | June 14, 1910 |
| 1,561,679 | Woodring | Nov. 17, 1925 |
| 1,590,357 | Feisthamel | June 29, 1926 |
| 1,938,255 | Hinderliter | Dec. 5, 1933 |
| 2,110,127 | Hinderliter | Mar. 8, 1938 |
| 2,204,586 | Grau | June 18, 1940 |
| 2,233,734 | Ely et al. | Mar. 4, 1941 |
| 2,345,019 | Van Alstyne | Mar. 28, 1944 |
| 2,377,196 | Walley | May 29, 1945 |
| 2,533,868 | Anderson | Dec. 12, 1950 |
| 2,631,871 | Stone | Mar. 17, 1953 |
| 2,671,949 | Welton | Mar. 16, 1954 |
| 2,711,171 | Dunnican | June 21, 1955 |
| 2,810,592 | Williams | Oct. 22, 1957 |

FOREIGN PATENTS

| 887,039 | France | July 26, 1943 |